United States Patent [19]

Podhrasky

[11] 4,423,377
[45] Dec. 27, 1983

[54] COMPACT METAL DETECTOR OF THE BALANCED INDUCTION TYPE

[75] Inventor: Robert J. Podhrasky, Dallas, Tex.

[73] Assignee: Garrett Electronics, Garland, Tex.

[21] Appl. No.: 206,182

[22] Filed: Nov. 12, 1980

[51] Int. Cl.³ .................. G01V 3/11; G01V 3/165
[52] U.S. Cl. .................................... 324/329; 324/133; 324/239
[58] Field of Search ......................... 324/326–329, 324/233, 239, 67

[56] References Cited

U.S. PATENT DOCUMENTS

| | | | |
|---|---|---|---|
| 2,129,058 | 9/1938 | Hedden | 324/329 X |
| 3,626,279 | 12/1971 | Walden | 324/329 |
| 3,769,575 | 10/1973 | Rist et al. | 324/329 |

FOREIGN PATENT DOCUMENTS 2524975 12/1976 Fed. Rep. of Germany ...... 324/329

OTHER PUBLICATIONS

Simonton, Jr.; John S., "Carpenter's Mate" *Popular Electronics*, Sep. 1969, pp. 69–72.
Whitehead C. C., "Metal Pipe or Wiring Locator" *Practical Electronics*, vol. 12, No. 12, pp. 952–955, Dec.1976.
Sargent–Sowell Catalog No. 150 (1979), p. 354.

*Primary Examiner*—Gerard R. Strecker
*Attorney, Agent, or Firm*—Richards, Harris & Medlock

[57] ABSTRACT

A metal detector is disclosed which has a transmit coil, a receive coil, and circuit means for detecting metal object due to a change in the magnetic coupling between the coils. Circuit board arrangement techniques are disclosed which enable the close placement of the transmit and receive coils and the circuit board, thereby allowing packaging of the metal detector in a small package. A low battery voltage indicator circuit is provided to warble an audio indicator signal to indicate sufficient battery voltage. In the event the battery voltage drops below a certain level, the warbling of the indicator signal ceases and a steady tone is generated thereby indicating a low battery voltage condition.

6 Claims, 6 Drawing Figures

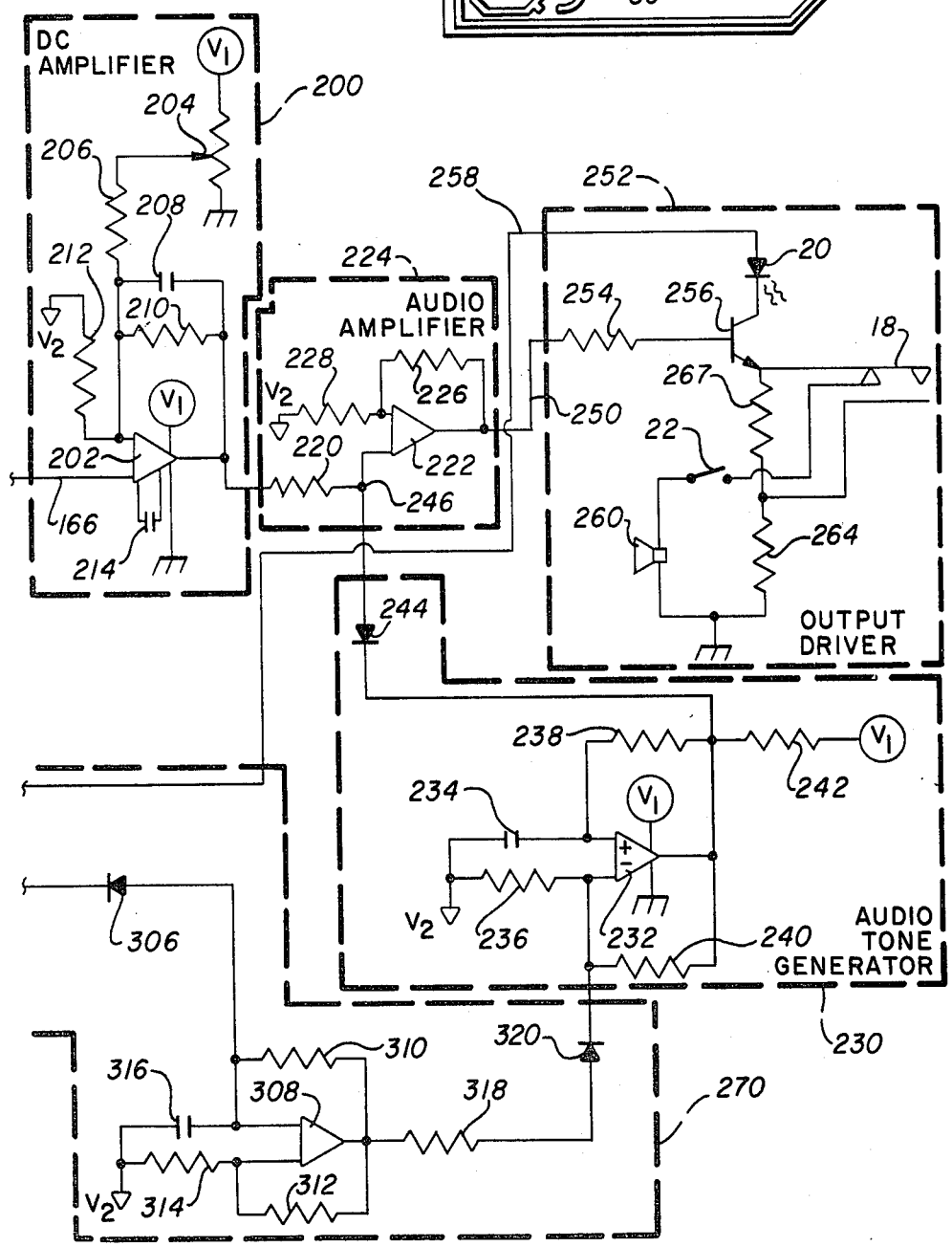

COMPACT METAL DETECTOR OF THE BALANCED INDUCTION TYPE

TECHNICAL FIELD

The present invention relates to metal detectors, and more particularly relates to a compact metal detector having a circuit board placed directly over transmit and receive coils, and having a low battery voltage indicator circuit.

BACKGROUND ART

Devices incorporating a transmit coil and a receive coil to detect the presence of metal have long been used in the metal detection art. In these devices a transmit coil has an oscillating current passed therethrough, and a receive coil is disposed adjacent the transmit coil such that the presence of metallic objects nearby causes a magnetic coupling between the transmit and receive coils. The receive coil then carries a current oscillating at the same frequency as the transmit coil. In these prior art devices, circuitry is provided to detect such a current in the receive coil or a preselected rate of change of current in the receive coil.

A drawback of prior metal detectors is that the transmit and receive coils are located at a position isolated from the detection circuitry. This isolation has been necessary because, had the receive coil been located at a position near the circuitry, the circuitry would have interacted with the receive coil and either given false detection signals or attenuated the sensitivity of the device by elevating the background level of magnetic coupling.

A further drawback of prior metal detectors is the lack of a convenient low battery voltage warning device. In many devices, it is necessary for the operator to take an affirmative step, such as closing a switch, in order to perform a battery test. In some devices, battery testing is not possible and the operator always takes a chance that the device will fail in the field due to an insufficiently charged battery.

DISCLOSURE OF THE INVENTION

The present invention provides an improved metal detector which makes possible the packaging of a metal-detecting instrument into a relatively small case. In a metal detector having a transmit coil, receive coil, and detection circuitry, the detection circuitry is located directly adjacent and above the transmit and receive coils.

A continuously operating low battery voltage indicator circuit is also provided. In accordance with this aspect of the invention, a tone is emitted from the detector upon the detection of a metallic object. When the battery voltage is acceptable, the tone emitted is modulated at a low frequency to produce a "warbling" tone. In the event the battery voltage drops below an acceptable level, the modulation ceases, and the device emits a steady tone. Other aspects and advantages will become apparent hereinafter.

BRIEF DESCRIPTION OF THE DRAWINGS

A more complete understanding of the invention and its advantages will be apparent from the Detailed Description taken in conjunction with the accompanying Drawings in which:

FIG. 4 is a reduced bottom view of the circuit board of FIG. 3 showing certain circuit paths etched thereon; and FIGS. 5a and 5b are schematic diagrams of a metal detector circuit having the low battery voltage indicator circuit of the present invention.

DETAILED DESCRIPTION

Figure 1:
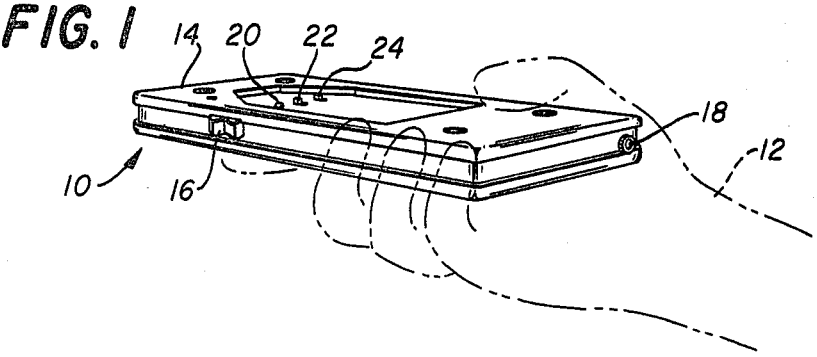
FIG. 1 is a perspective view of a compact metal detector constructed in accordance with the invention.

Referring initially to FIG. 1, a metal detector shown generally as 10 is held by hand 12 shown in phantom lines. Metal detector 10 is enclosed in case 14, and has power switch 16, earphone jack 18, light-emitting diode 20, and switches 22 and 24. As can be seen in FIG. 1, case 14 is relatively small and proportioned for easy hand-held operation. Alternatively, due to its small size, detector 10 may be carried in a pocket or belt-mounted holster. In the preferred embodiment, case 14 is approximately 6½" long, 3¼" wide, and 1¼" thick. Case 14 is constructed of a lightweight but strong plastic material to enable non-fatiguing hand-held use. The preferred embodiment weighs approximately nine ounces.

Figure 2:
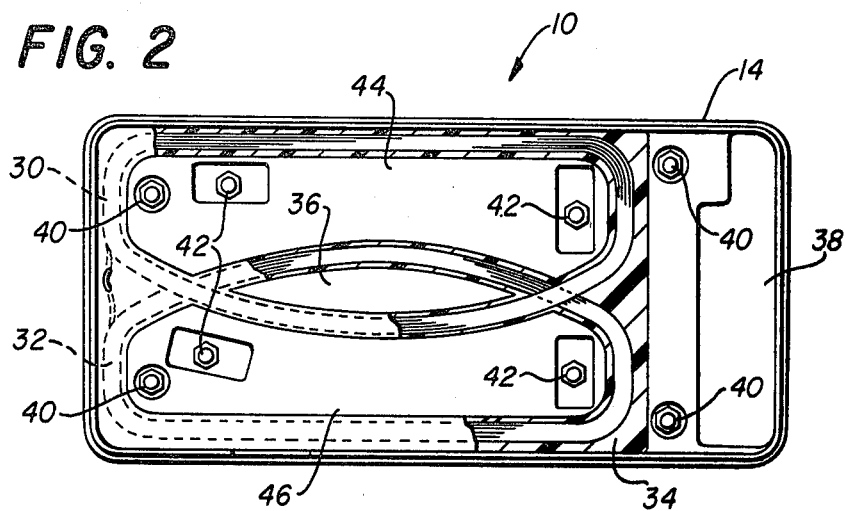
FIG. 2 is a partially sectional view showing receive coil and transmit coil placement within the metal detector of FIG. 1.

Referring now to FIG. 2, the placement of receive coil 30 and transmit coil 32 may be appreciated. Both receive coil 30 and transmit coil 32 are manufactured of lacquer-coated copper wire and have about 40 turns of wire each. Receive coil 30 and transmit coil 32 are permanently fixed in case 14, being surrounded by epoxy filler 34 and electrostaticly shielded. Receive coil 30 and transmit coil 32 each have an essentially flat cross-section and are essentially coplanar. Receive coil 30 encloses receive coil area 44 and transmit coil 32 encloses transmit coil area 46. Receive coil 30 and transmit coil 32 overlap slightly at area 36, such that a minimal amount of energy is directly induced by transmit coil 32 into receive coil 30. In this configuration, receive coil 30 and transmit coil 32 operate to scan an area which is approximately 80% of the length of case 14. Also shown in FIG. 2 are battery compartment 38, cover fasteners 40, and circuit board fasteners 42.

Figure 3:
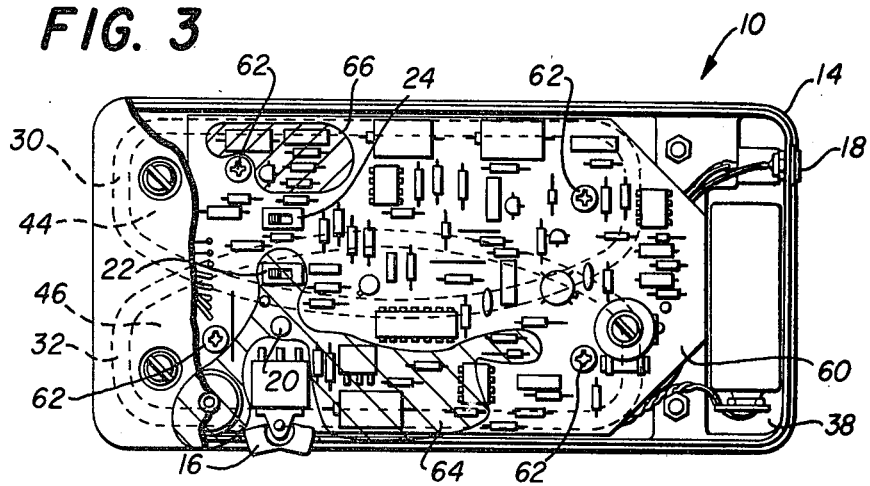
FIG. 3 is a top view of a circuit board within the metal detector of FIG. 1 showing the placement of various discrete circuit components.

Referring now to FIG. 3, the placement of circuit board 60 may be appreciated. Circuit board 60 is substantially planar and is attached to case 14 by screws 62 which mate with circuit board fasteners 42. Circuit board 60 has circuit paths etched on its underside, to be described in more detail in connection with FIG. 4. The circuit paths connect a variety of discrete components to form a metal detection circuit which is described in more detail in connection with FIGS. 5a and 5b. Relatively high current audio components are grouped together on circuit board 60 in shaded area 64. Shaded area 64 is located for the most part exterior of receive coil area 44. Another group of discrete components form an oscillator circuit and are grouped together on circuit board 60 in shaded area 66. The individual discrete components in shaded area 66 are physically placed relatively close to one another, as shown in FIG. 3.

Referring now to FIG. 4, a view of the underside of circuit board 60 is shown having selected circuit paths indicated. Circuit board 60 has holes 80 through which screws 62 pass. Included on circuit board 60 is grounding bus 82 which is etched along the edge of circuit board 60 but is noncontinuous, having ends 84 and 86 such that grounding bus 82 does not form a loop. Also shown in FIG. 4 are circuit paths 88, 90 and 92 which connect the discrete components which form an oscillator circuit. These components were described in connection with FIG. 3 as being located within shaded area 66. As can be seen in FIG. 4, circuit paths 88, 90 and 92 are noncontinuous paths which do not form loops. Circuit paths 88, 90 and 92 are arranged on board 60 in order to allow close placement of oscillator components and thus to minimize the total area of shaded area 66.

Figure 5A:
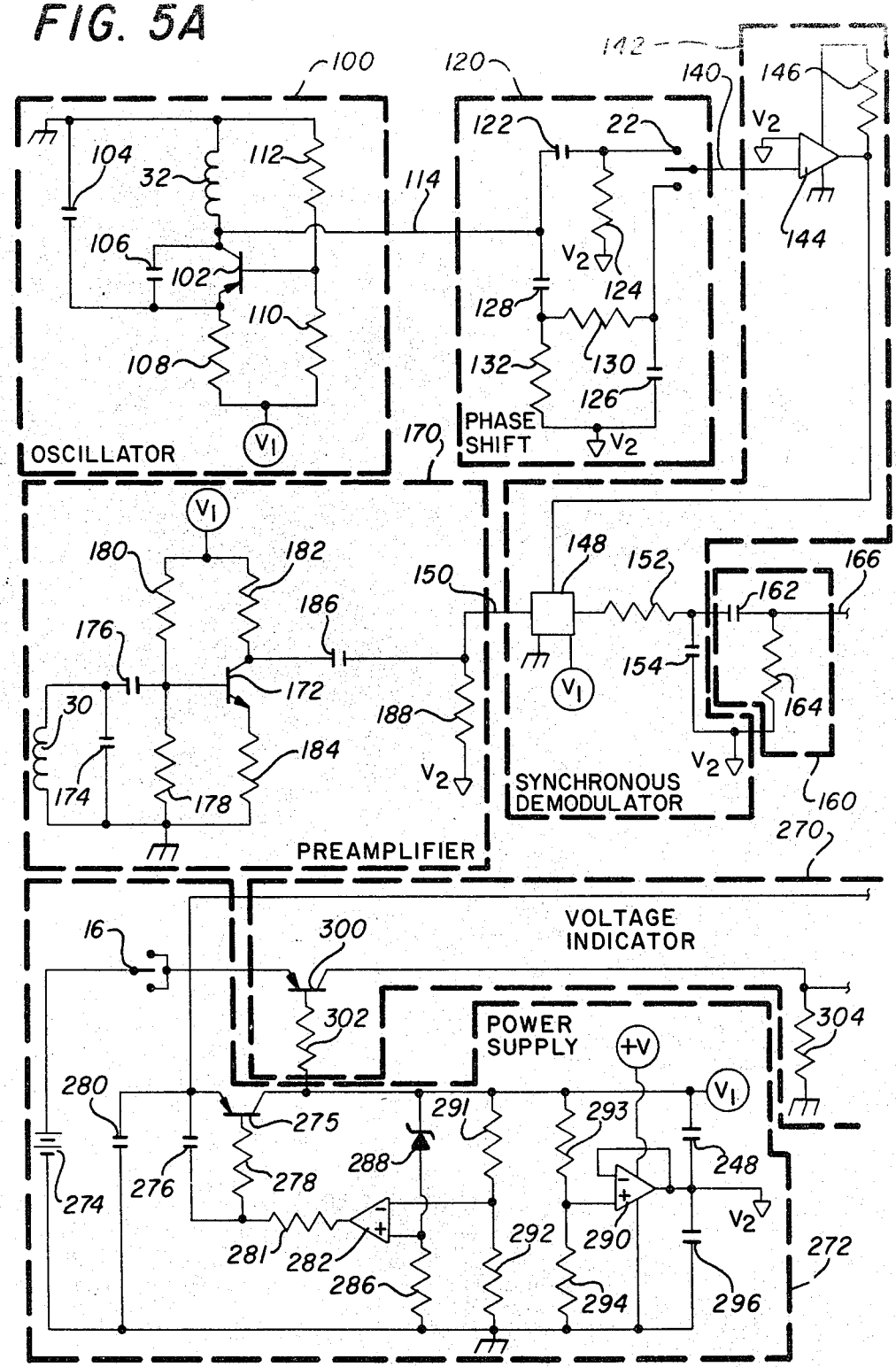

The metal detector circuit of the present invention is shown in FIGS. 5a and 5b. An oscillator 100 includes a transistor 102 and a tank circuit consisting of transmit coil 32 together with capacitors 104 and 106. An emitter resistor 108 and a base resistor 110 are connected to a voltage source $V_1$. Connections to voltage source $V_1$ are represented by a circle symbol throughout FIGS. 5a and 5b. The base of transistor 102 is connected to ground by resistor 112. Oscillator 100 generates a AC signal passed through coil 32 to establish an alternating electromagnetic field in the search area.

The signal generated by oscillator 100 is also transmitted through conductor 114 to phase shift circuit 120. In phase shift circuit 120, the signal generated by oscillator 100 is provided to one of two phase shift circuits selected by the operation of switch 22. Capacitor 122 and resistor 124 form a first phase shifting network which corresponds to a "weapons" mode of operation. Resistor 124 is connected to reference voltage $V_2$, which is symbolized by an inverted triangle throughout FIGS. 5a and 5b. The phase shift for the weapons mode is selected to provide maximum sensitivity to all metallic items, including guns, knives and the like. Capacitors 126 and 128 and resistors 130 and 132 form a second phase shift circuit which corresponds to a "building" mode of operation. The phase shift for the building mode is selected to provide a detection signal when the detector is passed near pipes and metallic studs behind interior walls, but to reject signals produced by nails in wooden studs. The building mode may also be used to reject bits of iron in trashy environments.

The phase shifted signal is passed through conductor 140 to synchronous demodulator 142. Synchronous demodulator 142 includes comparator 144 and a pullup resistor 146. Comparator 144 generates a square wave demodulator drive signal which is in phase with the input signal to comparator 144. The demodulator drive signal is provided to the control terminal of a solid state switch 148.

A receive signal is transmitted over line 150 to the input terminal of switch 148, wherein the signal is chopped by the square wave demodulator drive signal input on the control line. The demodulated signal at the output terminal of switch 148 is transferred through resistor 152 to a capacitor 154. The capacitor 154 is charged to DC level which is a function of the receive signal of line 150 and the demodulation drive signal input to switch 148.

The DC signal held on capacitor 154 is input to differentiator 160 formed by capacitor 162 and resistor 164. Differentiator 160 applies to conductor 166 a DC signal which is representative of the magnitude of the demodulated signal and the rate of change of the charge in capacitor 154. The use of differentiator 160 is a form of AC coupling, obviating the need for tuning out residual magnetic coupling.

The receive signal in receive coil 30 is amplified in preamplifier 170 before being applied to switch 148. The amount of electromagnetic energy generated by the transmit coil 32 and passed to receive coil 30 changes when a conductive medium is encountered and alters the character of the electromagnetic field. The electromagnetic field induces a signal in the receive coil 30. This receive signal is transferred through a filter network composed of capacitors 174 and 176 and resistor 178. Base current is applied to transistor 172 through resistor 180, and collector current is applied through resistor 182. Emitter current passes through resistor 184. The preamplified receive signal is applied to demodulator 142 through capacitor 186 which is coupled to reference voltage $V_2$ through resistor 188.

The DC level in conductor 166, which represents the rate of change of charge on capacitor 154, is amplified in DC amplifier 200. Amplifier 200 includes operational amplifier 202 which has an adjustable offset control. The offset control sets a threshold at which voltage from the differentiator will trigger a detection signal. The offset control includes potentiometer 204, resistor 206, capacitor 208, and resistor 210 which are connected to the reference voltage $V_2$ through resistor 212. Operational amplifier 202 has compensation capacitor 214 connected thereto for amplifier stability.

The output of DC amplifier 200 is connected through resistor 220 to the input of operational amplifier 222 included in an audio amplifier 224. Audio amplifier 224 further includes feedback resistor 226 and a connection to the reference voltage $V_2$ through resistor 228.

Audio tone generator 230 provides an audio signal of 2 khz as an input to audio amplifier 224. Audio tone generator 230 includes operational amplifier 232 configured as a tone generator with capacitor 234 and resistor 236 connected to the reference voltage $V_2$. Feedback resistors 238 and 240 connect the output of operational amplifier 232 to the non-inverting and inverting inputs respectively. The output of operational amplifier 232 is connected to voltage source $V_1$ through resistor 242. Diode 244 connects the output of audio tone generator 230 to the input of audio amplifier 224. When node 246 goes high, indicating an above-threshold detected rate of change of DC level of capacitor 154, diode 244 is forward-biased thereby allowing the passage of audio signals from audio tone generator 230 into audio amplifier 224. When the magnitude of change of charge on capacitor 154 is below the threshold level, diode 244 blocks audio signals from entering audio amplifier 224.

The output of audio amplifier 224 passes through line 250 into output driver 252 through resistor 254. Output driver 252 includes transistor 256 which amplifies collector current entering the driver circuit through line 258. Light-emitting diode 20 provides a visual detection signal. Speaker 260 provides an audible detection signal. Speaker 260 may be disabled by switch 22, and headphone jack 18 is provided for private listening. Resistors 262 and 264 set proper volume levels in the headphone.

The present invention includes a low battery voltage indicator circuit 270 which operates in conjunction with power supply 272. Power supply 272 includes battery 274 and switch 16. Battery 274 may be either a 9 V zinc-lead or 7.2 V nickel-cadmium rechargeable battery. Switch 16 is a three position off/on switch which allows momentary-on or continuous-on operation. Switch 16 is connected to the emitter of transistor 275 and the base of transistor 275 through capacitor 276 and resistor 278. The emitter of transistor 275 is connected to ground through capacitor 280. The junction of transistor 278 and capacitor 276 is also connected to the output of comparator 282 through resistor 281. The collector of transistor 275 is connected to voltage source $V_1$. Comparator 282 has its noninverting input connected to ground through resistor 286 and connected to $V_1$ through zener diode 288. The inverting input of comparator 282 is connected to the junction of a series combination of resistors 291 and 292.

A second operational amplifier 290 has the noninverting input thereof connected at the junction of a series combination of resistors 293 and 294. The output of operational amplifier 290 is connected directly to the inverting input thereof as a feedback circuit. The direct output of amplifier 290 supplies the reference voltage $V_2$. The output of amplifier 290 is further connected to the junction of capacitors 296 and 298, which are connected respectively to a terminal providing voltage source $V_1$ and ground. The power supply circuit 272 produces stable voltages $V_1$ and $V_2$ for driving the remainder of the metal detector circuit.

The low battery voltage indicator circuit 270 includes transistor 300 which has its emitter connected to positive battery voltage. The base of transistor 300 is connected to voltage source $V_1$ through resistor 302. The collector of transistor 300 is connected to ground through resistor 304 and to diode 306. Diode 306 is also connected to operational amplifier 308 which is configured as an oscillator. Resistors 310, 312 and 314, and capacitor 316 are selected to produce an oscillation frequency of about 20 hz. The output of operational amplifier 308 is connected to audio tone generator 230 through resistor 318 and diode 320.

In operation, transmit coil 32 radiates electromagnetic energy at a frequency of approximately 90 khz. Receive coil 30 is physically located adjacent transmit coil 32. Although the coils are positioned to minimize coupling, a certain residual level of coupling is always present. However, when a target is entered into the vicinity of the transmit and receive coils, and the target is conductive and/or has a permeability other than unity, there will be a change in the coupling of energy from the transmit coil 32 into the receive coil 30.

The signal produced by oscillator 100 and provided to transmit coil 32 is also conveyed to phase shift circuit 120 which has a weapons section and a building section. These two sections correspond to two possible modes of operation for the metal detector circuit of the present invention.

The receive signal is amplified by a preamplifier circuit 170 and transferred to the synchronous demodulator 142. Synchronous demodulator 142 is driven by either one of the two signals generated by phase shift circuit 120.

Within the synchronous demodulator 142 the phase shift signals are transformed into a square wave drive signal which operates the solid state switch 148. Switch 148 is turned on and off by operation of the drive signal to pass certain portions of the receive signal. The portions thus passed are used to charge capacitor 154, which averages the DC level of the signal transferred through switch 148. It will be appreciated that the charge level on capacitor 154 will be a function of the amplitude and phase relationship of the receive signal with respect to the demodulator drive signal produced by phase shift circuit 120.

Differentiator circuit 160 provides a DC signal which is representative of the rate of change of charge on capacitor 154. Thus, the output of differentiator 160 is zero when no target objects have passed through the vicinity of the transmit and receive coils. Likewise, if the metal detector is allowed to be stationary over a target, the change rate of charge on capacitor 154 will once again be zero and the output of differentiator 160 be zero accordingly. Thus it can be seen that the present metal detector circuit requires no initial tuning to overcome constant residual magnetic coupling between the transmit and receive coils.

The output of differentiator 160 is amplified in DC amplifier 200 with respect to a reference voltage supplied through potentiometer 204. Potentiometer 204 may be used to set the threshold rate of change in magnetic coupling which will produce a detection signal.

When a rate of change of magnetic coupling that exceeds the threshold is detected, the audio circuit is enabled thereby producing both a visual signal through light-emitting diode 20 and an audible signal through speaker 260. When the rate of change of magnetic coupling is zero, or the change is below the threshold level, the audio circuitry is disabled and no signals are thereby produced.

Audio tone generator 230 is configured to produce a frequency of about 2 khz. This signal is applied through transistor 256 to light-emitting diode 20 and speaker 260 when the audio circuit is enabled.

The low battery voltage indicator circuit 270 includes a second oscillator comprising operational amplifier 308 operating at a frequency of about 20 hz. Battery test indicator 270 serves to "warble" the 2 khz signal applied to the output driver circuit 252 when battery 274 has sufficient voltage. In the preferred embodiment, power supply 272 has an output voltage source $V_1$ of six volts. When the voltage of battery 274 exceeds voltage source $V_1$ by approximately a 0.6 volt threshold, transistor 300 is enabled thereby causing diode 306 to be reverse biased. The reverse biasing of diode 306 allows the warbling frequency modulation of low battery voltage indicator circuit 270 to be applied to the audio output. If, however, the voltage of battery 274 drops below the threshold level, transistor 300 ceases to conduct, and diode 306 is forward biased thereby grounding operational amplifier 308 and interrupting the warbling frequency modulation by inhibiting the oscillator circuit of operational amplifier 308. The inhibited condition of low battery voltage indicator circuit 270 does not affect operation of audio tone generator 230 due to the presence of diode 320 between the two circuits. Thus, a steady 2 khz signal emitted by the speaker or earphone indicates a low battery voltage condition.

Another aspect of the present invention is the placement of certain circuit components with respect to the transmit and receive coils. Prior art devices tend to be bulky and difficult to manage because the detection circuitry must be isolated from the transmit and receive coils in order to avoid unwanted magnetic coupling between the circuit and the coils. The present invention solves this problem by means of selective placement of various circuitry components and circuit paths on the circuit board.

Referring now to FIG. 3, with the exception of switch 22, shaded area 64 is located exterior receive coil area 44. It has been found that the location of a major portion of the alternating current components exterior the receive coil area will avoid excessive residual magnetic coupling and increase the sensitivity of the metal detector. Accordingly, in the preferred embodiment the high current audio components which form audio tone generator 230 and output driver 252 are located on circuit board 60 within shaded area 64.

The circuitry components which make up oscillator 100 are located on circuit board 60 within shaded area 66. Although oscillator 100 is an alternating current circuit, the current levels are of a sufficiently small magnitude that the circuit components may be located over the receive coil area, if certain precautions are taken. As shown in FIG. 4, the circuit paths on circuit board 60 associated with oscillator 100 are configured so that there is minimal current flow in a loop. Another precaution to be taken with respect to the oscillator circuit is that the area between parallel wires must be minimized. Thus, the components within shaded area 66 are located as close to one another as possible.

Another precaution taken to enable close proximity of the detector circuit and transmit and receive coils is that no circuit board edgework is formed in a loop configuration. It is a common practice in the circuit board layout art to provide a grounding bus that runs around the edge of a circuit board. As shown in FIG. 4, the grounding bus 82 is noncontinuous in order to prevent a loop configuration which would have a deleterious effect on circuit performance.

Thus, the present invention provides a compact metal detector having a transmit coil, a receive coil, and metal detector circuitry located together in a relatively small package. The placement of the transmit and receive coils and the circuit board adjacent one another enables convenient packaging which was not possible heretofore. A further aspect of the present invention is the low battery voltage indicator circuit. The audio detection signal is warbled when the battery has sufficient voltage. In the event the battery drops below a threshold level, the warbling of the tone ceases and a steady tone is generated thereby indicating a low battery voltage condition.

Although an embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What is claimed is:

1. A compact metal detector of the balanced induction type comprising:
   (a) a planar assembly having a perimeter, a transmit coil disposed on said assembly enclosing a planar transmit coil area, a receive coil disposed on said planar assembly enclosing a planar receive coil area, said receive coil area being coplanar with the transmit coil area, and said receive coil being disposed adjacent said transmit coil;
   (b) a planar circuit board having a perimeter substantially corresponding to the perimeter of said planar assembly, said planar circuit board disposed parallel and above said planar assembly such that said entire transmit and receive coil areas are covered by said planar circuit board; and
   (c) circuit means including alternating current components which produce a high level oscillating current in response to signals produced in said receive coil and provide said high level oscillating current to a speaker, said components located on said planar circuit board exterior of said receive coil area such that said high level oscillating current does not induce a corresponding high level oscillating current in said receive coil.

2. The compact metal detector of claim 1 wherein said planar circuit board includes a noncontinuous grounding bus around the perimeter of said circuit board.

3. The compact metal detector of claim 1 wherein said circuit means includes oscillator components for applying a low level oscillating current to said transmit coil, said oscillator components disposed over said receive coil area and connected to one another by separate circuit board paths such that there is a minimum of said low level oscillating current flowing through a combination of said oscillator components and said circuit board paths which form a circuit loop.

4. The metal detector of claim 3 wherein said oscillator components are juxtaposed one another to minimize the area between said components.

5. The metal detector of claim 1 wherein said alternating current components comprise a tone generator and an output driver circuit for driving said speaker with said high level oscillating current.

6. A compact metal detector of the balanced induction type comprising:
   (a) a transmit coil enclosing a planar transmit coil area;
   (b) a receive coil enclosing a planar receive coil area, said receive coil area being coplanar with said transmit coil area, and said receive coil being disposed adjacent said transmit coil;
   (c) a planar circuit board having a perimeter and being parallel to and disposed directly above said transmit coil and receive coil areas;
   (d) alternating current audio components which produce a high level oscillating current in response to signals produced in said receive coil to drive a speaker, said audio components located on said circuit board exterior of said receive coil area such that said high level oscillating current does not induce a corresponding high level oscillating current in said receive coil;
   (e) a noncontinuous grounding bus around said perimeter of said circuit board;
   (f) oscillator components for applying a low level oscillating current to said transmit coil, said oscillator components located on said circuit board and disposed over said receive coil area, said oscillator components being connected to one another by separate circuit board paths such that there is a minimum of said low level oscillating current flowing through a combination of said oscillator components and said circuit board paths which form a circuit loop, said oscillator components being juxtaposed one another to minimize the area between said components.

* * * * *

UNITED STATES PATENT AND TRADEMARK OFFICE
CERTIFICATE OF CORRECTION

PATENT NO. : 4,423,377
DATED : Dec. 27, 1983
INVENTOR(S) : Robert J. Podhrasky

It is certified that error appears in the above—identified patent and that said Letters Patent is hereby corrected as shown below:

Column 2, line 18, after "10" insert --,--.
Column 3, line 30, change "22" to --24--.
Column 3, line 31, change "network" to --circuit--.
Column 4, line 54, change "amplifies" to --conducts--.
Column 4, lines 58-59, change "headphone" to --earphone--.
Column 4, line 60, change "262" to --267--.
Column 4, line 60, change "headphone" to --earphone--.
Column 4, line 64, before "switch" insert --power--.
Column 5, line 4, delete "also".
Column 5, line 12, change "A" to --An--.
Column 5, line 12, delete "second".
Column 5, line 16, delete "direct".
Column 5, line 21, delete "circuit".
Column 5, line 52, delete "a".
Column 5, lines 51-52, delete "circuit".
Column 6, line 1, delete "circuit".
Column 6, line 8, after "160" insert --will--.
Column 6, line 31, change "a second" to --an--.
Column 6, line 31, change "comprising" to --including--.
Column 6, lines 32-33, change "Battery test" to --Low battery voltage--.

UNITED STATES PATENT AND TRADEMARK OFFICE
CERTIFICATE OF CORRECTION

PATENT NO. : 4,423,377
DATED : Dec. 27, 1983
INVENTOR(S) : Robert J. Podhrasky

It is certified that error appears in the above—identified patent and that said Letters Patent is hereby corrected as shown below:

Column 6, line 33, after "indicator" insert --circuit--.

In the Abstract, line 4, change "object" to --objects--.

In the phase shift circuit 120, change the reference numeral "22" to --24--.

In the power supply circuit 272, change the reference numeral "248" to --298--.

Signed and Sealed this

Third Day of July 1984

[SEAL]

Attest:

GERALD J. MOSSINGHOFF

Attesting Officer    Commissioner of Patents and Trademarks